(12) United States Patent
Hara et al.

(10) Patent No.: US 7,995,865 B2
(45) Date of Patent: Aug. 9, 2011

(54) APPARATUS AND METHOD FOR LAYING OUT IMAGES AND PROGRAM THEREFOR

(75) Inventors: Toshita Hara, Tokyo (JP); Takao Ina, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 1023 days.

(21) Appl. No.: 11/884,700

(22) PCT Filed: Feb. 17, 2006

(86) PCT No.: PCT/JP2006/303355
§ 371 (c)(1),
(2), (4) Date: Aug. 20, 2007

(87) PCT Pub. No.: WO2006/088244
PCT Pub. Date: Aug. 24, 2006

(65) Prior Publication Data
US 2008/0260289 A1  Oct. 23, 2008

(30) Foreign Application Priority Data

Feb. 21, 2005   (JP) ................................ 2005-044077

(51) Int. Cl.
*G06K 9/32* (2006.01)
*G09G 5/00* (2006.01)
(52) U.S. Cl. ........................................ 382/294; 345/629
(58) Field of Classification Search .................. 382/173, 382/254, 298, 299, 305, 294, 312; 358/1.15; 345/629; 348/231.2, 239, 207.2, 240.99; 715/243

See application file for complete search history.

(56) References Cited

U.S. PATENT DOCUMENTS

| 6,636,648 | B2 * | 10/2003 | Loui et al. ..................... 382/284 |
| 6,727,909 | B1 * | 4/2004 | Matsumura et al. .......... 345/629 |
| 6,766,332 | B2 * | 7/2004 | Miyazaki et al. ..................... 1/1 |
| 7,308,650 | B2 * | 12/2007 | Yamakado et al. ........... 715/243 |
| 7,339,692 | B2 * | 3/2008 | Tanaka .......................... 358/1.15 |
| 7,586,524 | B2 * | 9/2009 | Tsue et al. .................. 348/231.2 |
| 7,593,045 | B2 * | 9/2009 | Ikeda et al. .................... 348/239 |

FOREIGN PATENT DOCUMENTS

| EP | 0 899 666 A1 | 3/1999 |
| JP | 1-185949 A | 7/1989 |
| JP | 7-333736 | 12/1995 |
| JP | 9-214868 A | 8/1997 |
| JP | 11-85949 A | 3/1999 |
| JP | 2000-299777 A | 10/2000 |
| JP | 2000-341644 A | 12/2000 |
| JP | 2001-157158 A | 6/2001 |
| JP | 2003-250130 A | 9/2003 |
| JP | 2004-21440 A | 1/2004 |
| JP | 2004-312463 A | 11/2004 |

* cited by examiner

*Primary Examiner* — Kanji Patel
(74) *Attorney, Agent, or Firm* — Birch, Stewart, Kolasch & Birch, LLP

(57) ABSTRACT

Images can be laid out easily without a template. Reference areas are set in a background area, and the images are laid out by being inscribed therein. In the case where the image laid out in one of the reference areas has high priority, a similar area is generated from the reference areas, and the image is enlarged to be inscribed in the similar area.

8 Claims, 10 Drawing Sheets

APPARATUS AND METHOD FOR LAYING OUT IMAGES AND PROGRAM THEREFOR

TECHNICAL FIELD

The present invention relates to an image layout apparatus and an image layout method for displaying a catalog of images by arranging the images. The present invention also relates to a program for causing a computer to execute the image layout method.

BACKGROUND ART

Photograph album prints have conventionally been generated by printing images laid out on single sheets. By laying out images on single sheets, a photograph album can be generated easily, since prints do not need to be pasted later on a photo mount.

However, an attractive image layout requires special knowledge, and laying out images is a time-consuming operation.

For this reason, various kinds of methods have been proposed for laying out images with ease (see Japanese Unexamined Patent Publication Nos. 9 (1997)-214868 and 2000-299777). In a method described in Japanese Unexamined Patent Publication No. 9 (1997)-214868, necessary and unnecessary images are specified by a user when the images are shown to the user, and only the necessary images are laid out. According to this method, a photograph album can also be printed easily by preparing a template for image insertion. In a method described in Japanese Unexamined Patent Publication No. 2000-299777, images are arranged according to time of photography thereof, and the images are laid out at positions preset according to the size and orientation of each of the images.

However, in the method described in Japanese Unexamined Patent Publication No. 9 (1997)-214868, a user himself/herself needs to decide an image layout, and a template is necessary. Furthermore, in the method described in Japanese Unexamined Patent Publication No. 2000-299777, only layouts available according to combinations of image orientations can be used. Therefore, variations of the layouts are limited.

The present invention has been conceived based on consideration of the above circumstances. An object of the present invention is therefore to lay out images easily without preparing a template.

DISCLOSURE OF INVENTION

An image layout apparatus of the present invention is an image layout apparatus for laying out images, and the image layout apparatus comprises:

layout control means for laying out the images in a background area having a plurality of rectangular reference areas by respectively inscribing the images in the reference areas in such a manner that each of the images is enlarged to be inscribed in an area similar to the reference areas and comprising more of the reference areas as the priority thereof becomes higher; and display means for displaying a catalog of the images laid out in the background area.

The reference areas are set in the background area without spacing or separately from each other with spacing. Although the reference areas are rectangular, it is preferable for the reference areas to be squares.

The priority may be set by a user having the images. In this case, the priority is preset for each of the images. The priority is described in header information of each of the images, for example. The user may set the priority while viewing the images for layout. The priority may have 3 levels or more, or 2 levels such as "preferred" and "not preferred".

In the image layout apparatus of the present invention, in the case where the images include a moving image, the layout control means may extract more scenes included in the moving image as the priority thereof becomes higher so that the extracted scenes are respectively laid out to be inscribed in the corresponding reference areas.

The image layout apparatus of the present invention may further comprise input means for receiving input of various kinds of instructions. In this case, the layout control means arranges all the images by respectively inscribing the images in the reference areas, and lays out a specified one of the arranged images regarded as an image whose priority is high in the similar area comprising a quantity of the reference areas corresponding to how many times the image has been specified while laying out a part of the images that are thus moved off the background area being processed in a next background area.

In the image layout apparatus of the present invention, the layout control means may lay out the image having been arranged in the similar area in the corresponding original reference area by inscribing the image in the reference area in the case where the image has been specified more than a predetermined number of times.

In the image layout apparatus of the present invention, the layout control means may arrange all the images in the reference areas by respectively inscribing the images therein. In this case, in the case where a specified one of the arranged images is a moving image, the layout control means regards the moving image as an image whose priority is high, and extracts more scenes in the specified moving image so that the extracted scenes are respectively laid out in the corresponding reference areas by being inscribed therein. The layout control means lays out a part of the images that are thus moved off the background area being processed in a next background area.

The image layout apparatus of the present invention may further comprise storage means for storing information on layout of the images as layout information.

The image layout apparatus of the present invention may also comprise printing means for printing the images having been laid out.

The image layout apparatus of the present invention may be installed in a digital camera.

The image layout apparatus of the present invention may also be installed in an order terminal for placing a print order regarding the images.

An image layout method of the present invention is an image layout method for laying out images, and the method comprises the steps of:

laying out the images in a background area having a plurality of rectangular reference areas by respectively inscribing the images in the reference areas in such a manner that each of the images is enlarged to be inscribed in an area similar to the reference areas and comprising more of the reference areas as the priority thereof becomes higher; and displaying a catalog of the images laid out in the background area.

The image layout method of the present invention may be provided as a program for causing a computer to execute the method.

Note that the program of the present invention may be provided being recorded on a computer readable medium.

Those who are skilled in the art would know that computer readable media are not limited to any specific type of device, and include, but are not limited to: floppy disks, CD's, RAM's, ROM's, hard disks, magnetic tapes, and internet downloads, in which computer instructions can be stored and/or transmitted. Transmission of the computer instructions through a network or through wireless communication means is also within the scope of this invention. Additionally, computer instructions include, but are not limited to: source, object, and executable code, and can be in any language, including higher level languages, assembly language, ad machine language.

According to the present invention, the higher the priority is, the more largely the corresponding image is enlarged to be inscribed in the similar area comprising more of the reference areas. Therefore, the image of high priority is enlarged and displayed in the background area while the other images are displayed smaller than the image of high priority. For this reason, the images can be laid out without a template in such a manner that the image of high priority can be displayed in a larger size. Furthermore, since the images are laid out by simply setting the priority to each of the images, the images can be laid out easily. In addition, since the images are laid out by being inscribed in the reference areas and the similar area, calculations for scaling can be easier. In this manner, processing for laying out the images can be carried out fast.

In the case where the images include a moving image, more scenes are extracted as the priority thereof becomes higher. By respectively laying out the extracted scenes in the corresponding reference areas, the moving image can be laid out easily.

By arranging all the images to be inscribed respectively in the reference areas and by laying out the specified one of the arranged images as the image of high priority in the similar area comprising the quantity of the reference areas corresponding to how many times the image has been specified, a user can lay out the images while confirming the image of high priority. In this manner, a preferable layout reflecting an intention of the user can be realized.

At this time, in the case where the image has been specified more than the predetermined number of times, the specified image is laid out by being inscribed in the corresponding original reference area. Therefore, the user can lower the priority of the image that the user once thought to be important.

In this state, in the case where the image specified as the image of high priority is a moving image, the moving image is regarded as an image of high priority. More scenes are then extracted from the moving image as how many times the image has been specified becomes larger, and the extracted scenes are laid out in the corresponding reference areas respectively by being inscribed therein. In this manner, the user inputting an instruction can lay out the moving image while confirming the moving image of high priority. Therefore, a preferable layout reflecting an intention of the user can be realized.

Furthermore, by storing the information on the layout of the images as the layout information, printing or display of the images can be carried out later with use of the layout information.

In addition, by printing the images having been laid out, a photograph album having the images can be obtained.

BRIEF DESCRIPTION OF DRAWINGS

FIG. 9 shows the catalog screen after enlargement and advancing processing;

FIG. 10 shows the catalog screen after two images have been enlarged;

BEST MODE FOR CARRYING OUT THE INVENTION

Figure 1:
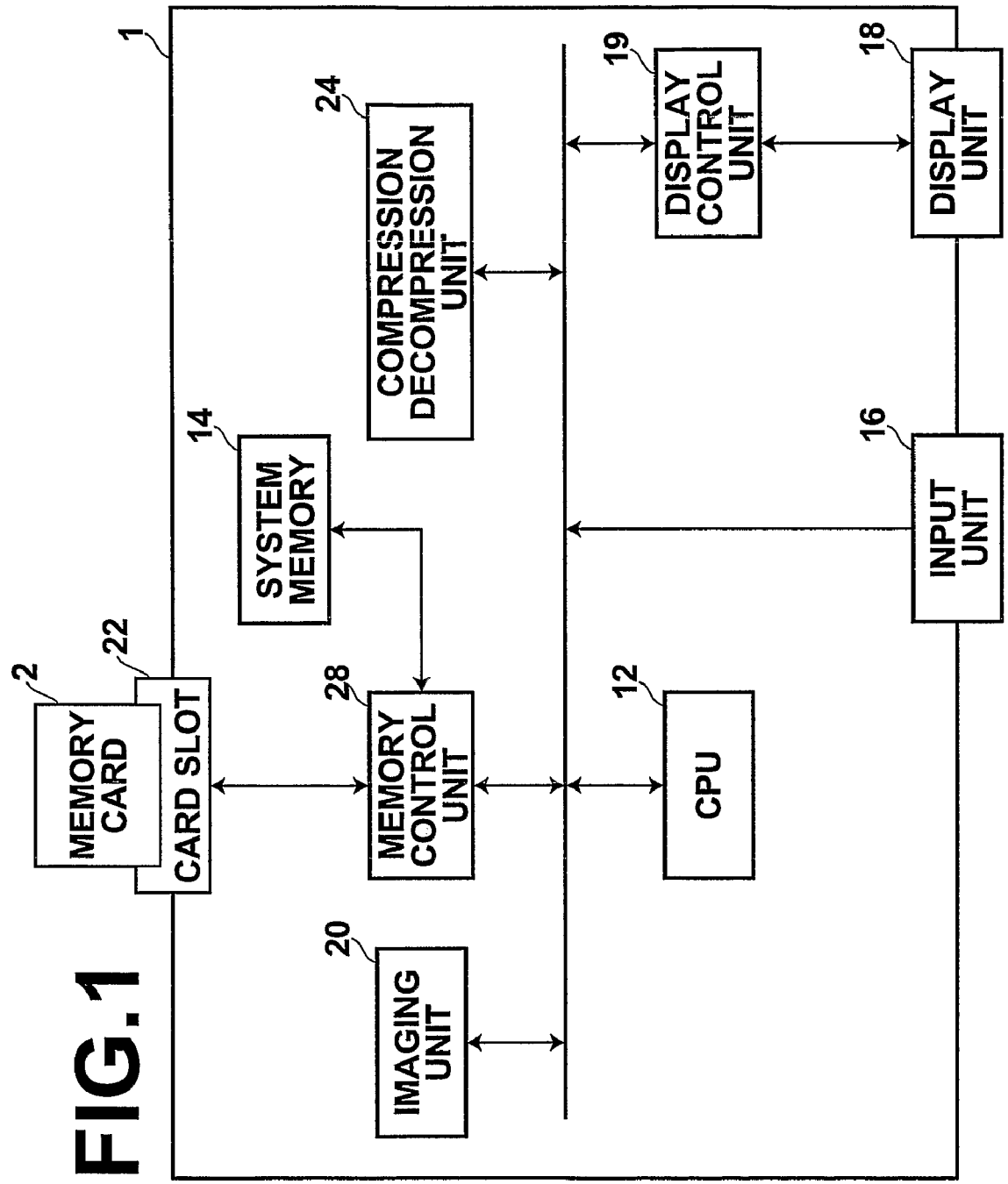
FIG. 1 is a block diagram showing the configuration of a digital camera adopting an image layout apparatus of an embodiment of the present invention.

Hereinafter, an embodiment of the present invention will be described with reference to the accompanying drawings. FIG. 1 is a block diagram showing the configuration of a digital camera adopting an image layout apparatus of the embodiment of the present invention. As shown in FIG. 1, a digital camera 1 in this embodiment comprises a CPU 12, a system memory 14, an input unit 16, a display unit 18, a display control unit 19, and an imaging unit 20. The CPU 12 carries out various kinds of control such as photography control, recording control, and display control of images. The CPU 12 also controls each unit comprising the digital camera 1. The system memory 14 comprises a ROM for storing a program for operating the CPU 12, programs for image viewing and layout, and various kinds of constants. The system memory 14 also comprises a RAM used as a workspace for processing carried out by the CPU 12. The input unit 16 comprises a navigation key and various kinds of buttons for inputting various instructions to the digital camera 1. The display unit 18 comprises a liquid crystal display monitor or the like used for various kinds of display. The display control unit 19 controls the display unit 18. The imaging unit 20 comprises a CCD, a photography lens, and the like for obtaining an image by photography.

The image layout apparatus 1 also comprises a card slot 22 for reading an image from a memory card 2 and for storing an image obtained by photography in the memory card 2, a compression decompression unit 24 for compressing an image according to a method using JPEG, motion JPEG, or the like and for decompressing the compressed image, and a memory control unit 28 for controlling the system memory 14 and the card slot 22. The digital camera 1 can obtain a moving image.

The CPU 12 serves as layout control means by executing the program for image layout.

Figure 2:
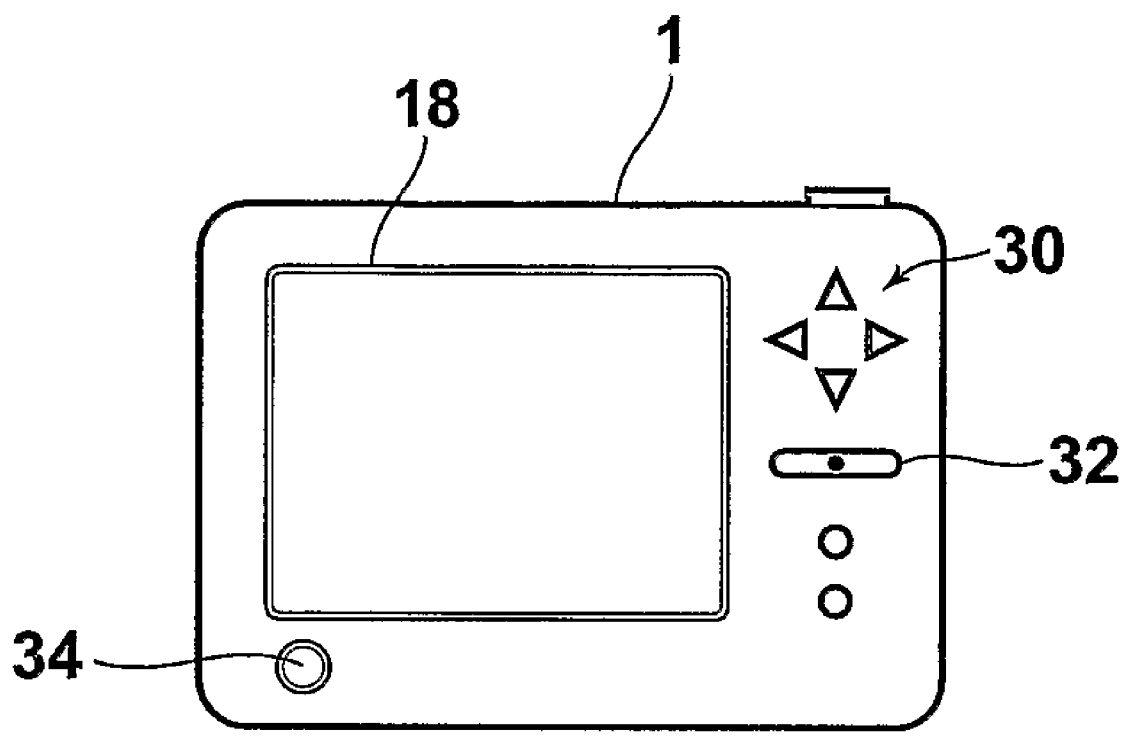
FIG. 2 is a rear view of the digital camera in the embodiment.

FIG. 2 is a rear view of the digital camera 1 in this embodiment. As shown in FIG. 2, the display unit 18 and the input unit 16 are located at the back of the digital camera 1. The input unit 16 has a navigation key 30 and various kinds of operation buttons including a mode change switch 32 and an album generation switch 34.

The navigation key 30 is used for selecting a command, and for advancing and selecting an image in an image reproduction mode, for example. The mode change switch 32 is used for changing a mode of the digital camera 1 between a photography mode, a moving image mode, and the image reproduction mode. The album generation switch 34 is used in image layout processing that will be described later.

Figure 3:
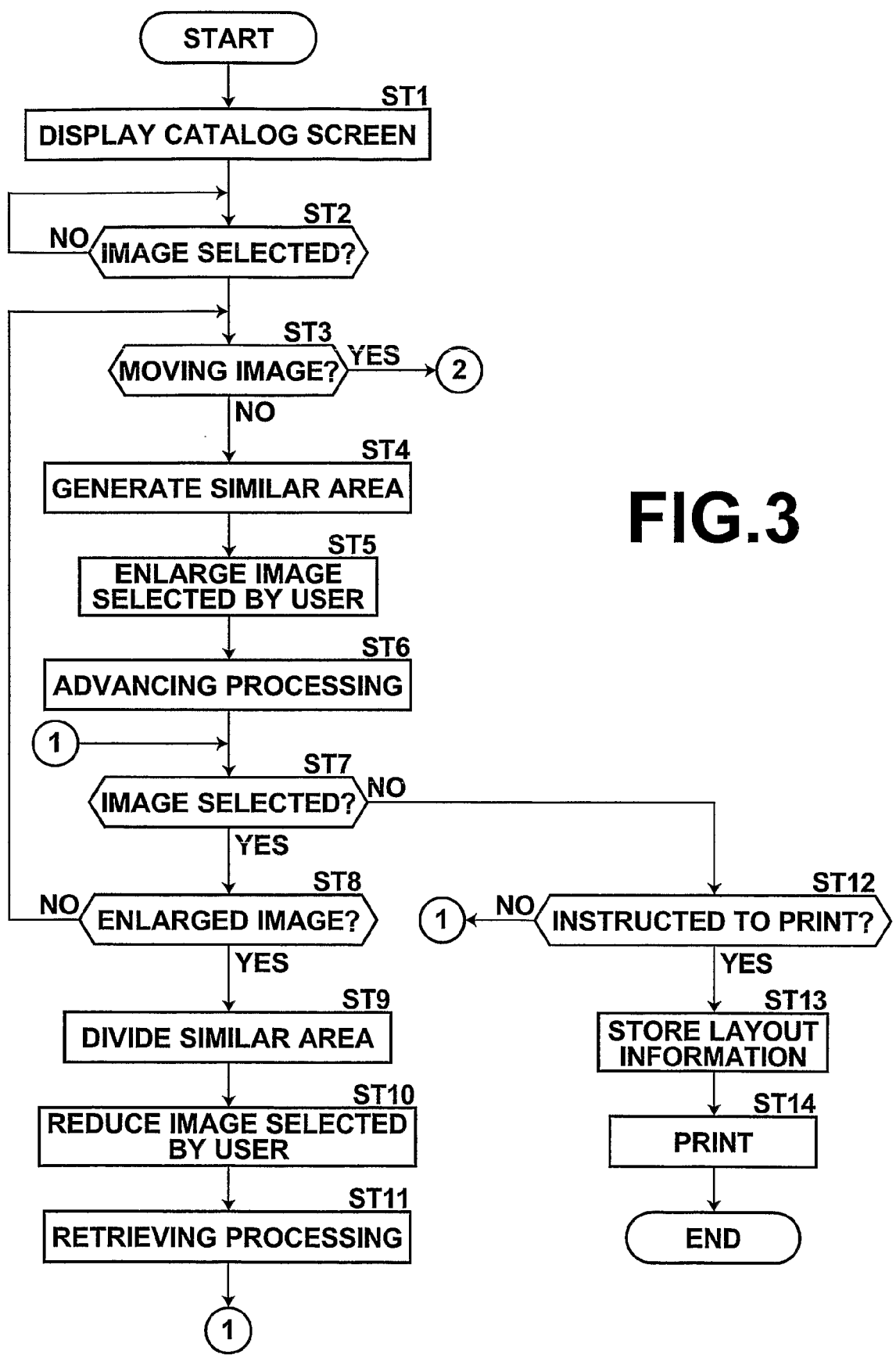
FIG. 3 is a flow chart showing image layout processing carried out in the embodiment.
Figures 4, 5:
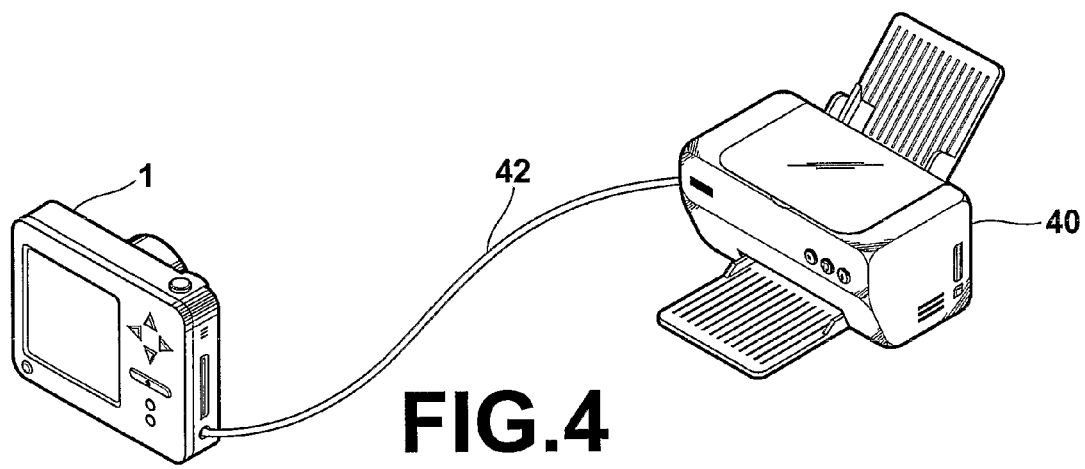
FIG. 4 shows a state wherein the digital camera in the embodiment is connected to a printer by a cable.
FIG. 5 shows an initial screen of a catalog screen of images displayed on a display unit.

A procedure carried out in this embodiment will be described next. FIG. 3 is a flow chart showing the image layout processing carried out in the embodiment. The image layout processing is carried out in a state where the digital camera 1 in this embodiment is connected to a printer 40 by a cable 42, as shown in FIG. 4. The memory card 2 stores still images and moving images.

When a user of the digital camera 1 uses the mode change switch 32 to change to the image reproduction mode and presses the album generation switch 34, the processing starts. The CPU 12 displays an initial screen of a catalog screen of the images stored in the memory card 2 on the display unit 18 (Step ST1). For the moving images, a first scene of each of the moving images is included in the catalog screen.

Figure 6:
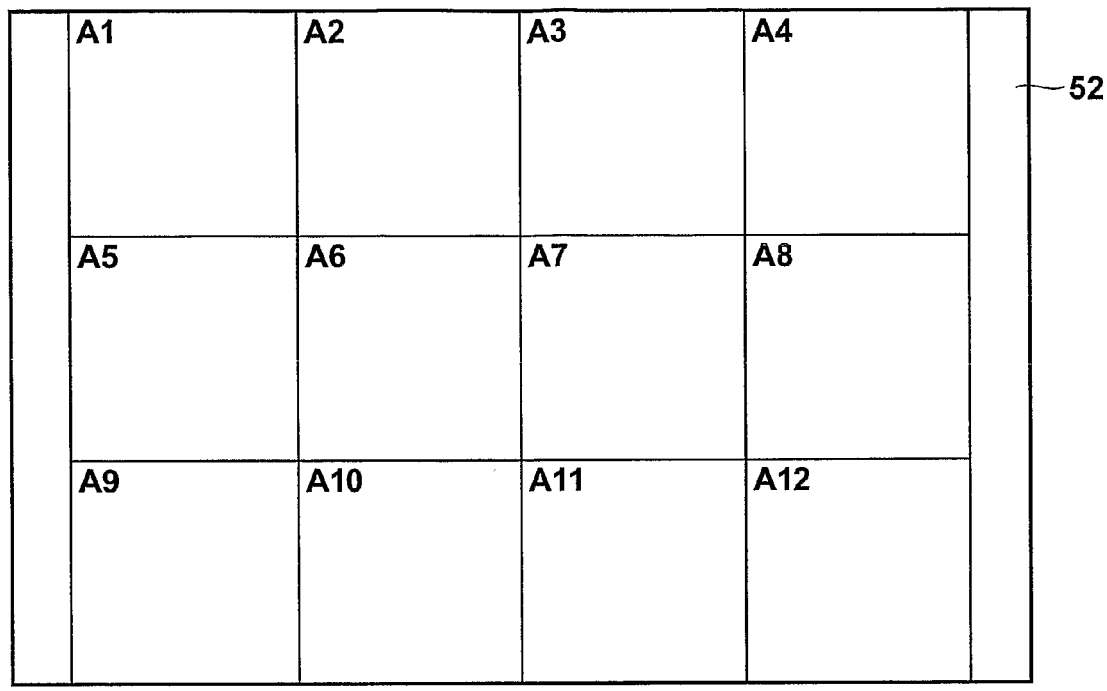
FIG. 6 shows an example of reference areas set in a background area.
Figure 7A:
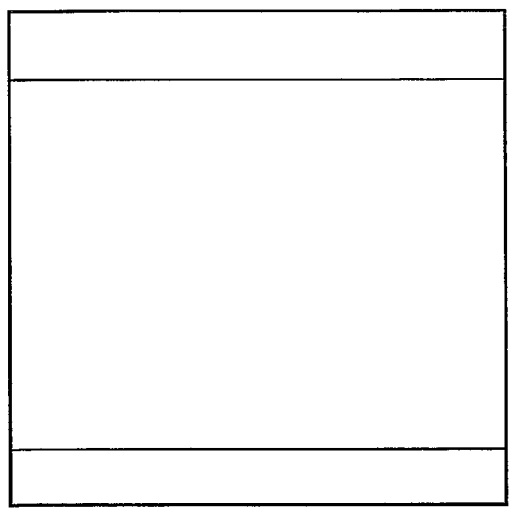
FIGS. 7A and 7B show how images are inscribed in the reference areas.
Figure 7B:
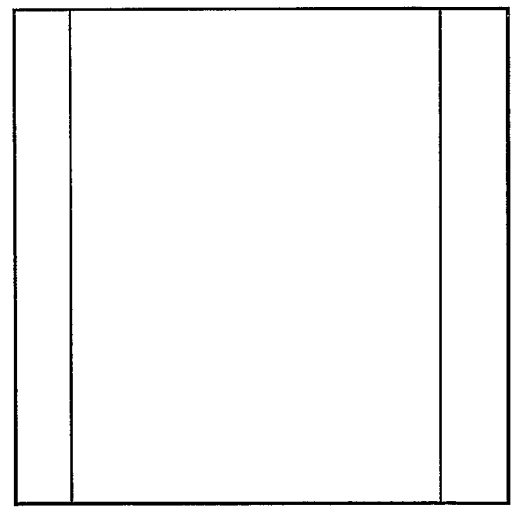

FIG. 5 shows the initial screen of the catalog screen of the images displayed on the display unit 18. A background area 52 in a catalog screen 50 has square reference areas. FIG. 6 shows an example of the reference areas set in the background area 52. As shown in FIG. 6, the background area 52 has 12 reference areas A1~A12 comprising 3 rows and 4 columns. The catalog screen 50 includes images T1~T12 inscribed respectively in the reference areas A1~A12. For the images having the landscape orientation, each of the images is laid out as shown in FIG. 7A in such a manner that the image is in contact with the right and left sides of the corresponding reference area. For the images of portrait orientation, the images are laid out in such a manner that the images are in contact with the upper and lower sides of the corresponding reference areas, as shown in FIG. 7B.

In the case where the number of the images stored in the memory card 2 is larger than 12, the catalog screen 50 can be changed to a next or previous screen by operation of the input unit 16. The images T1~T12 are displayed in the catalog screen 50 in ascending order of photography time and date. However, the images may be displayed in descending order of the photography time and date, or in order of file names.

The CPU 12 then starts monitoring whether the user has carried out selection of any one of the images in the catalog screen 50 (Step ST2). For the selection, the user selects a desired one of the images displayed in the catalog screen 50 by using the navigation key 30, and presses the album generation key 34.

If a result at Step ST2 is affirmative, the CPU 12 judges whether the selected image is a moving image (Step ST3). If a result at Step ST3 is negative, the CPU 12 judges that the image selected by the user is preferred by the user and thus has high priority, and generates a similar area by grouping four of the reference areas including the reference area for the selected image (Step ST4).

Figures 8A, 8B:
FIGS. 8A and 8B show how a similar area is generated.

FIG. 8 shows how the similar area is generated. In FIG. 8, the images T1~T12 are not shown. In the case where the user has selected the image T1 laid out in the reference area A1 as shown in FIG. 8A, the CPU 12 groups the reference areas A1, A2, A5, and A6 together for generating a similar area A101 comprising the four reference areas, as shown in FIG. 8B. The CPU 12 enlarges the image T1 selected by the user so that the image T1 is inscribed in the similar area A101 (Step ST5), and carries out advancing processing.

By generation of the similar area A101, the reference areas A2, A5, and A6 are deleted from the catalog screen 50. Therefore, the number of images displayed in the catalog screen 50 is 9, including the enlarged image (hereinafter referred to as the image T1'). Consequently, not all the 12 images T1~T12 initially displayed in the catalog screen 50 are displayed. For this reason, the CPU 12 deletes the images T10~T12 having the latest, second latest, and third latest photography time and date from the catalog screen 50, and lays out the images T2~T9 in the reference areas A3, A4, and A7~A12, respectively. The deleted images T10~T12 are included in the next screen of the catalog screen. This processing is referred to as the advancing processing.

Figures 9, 10:
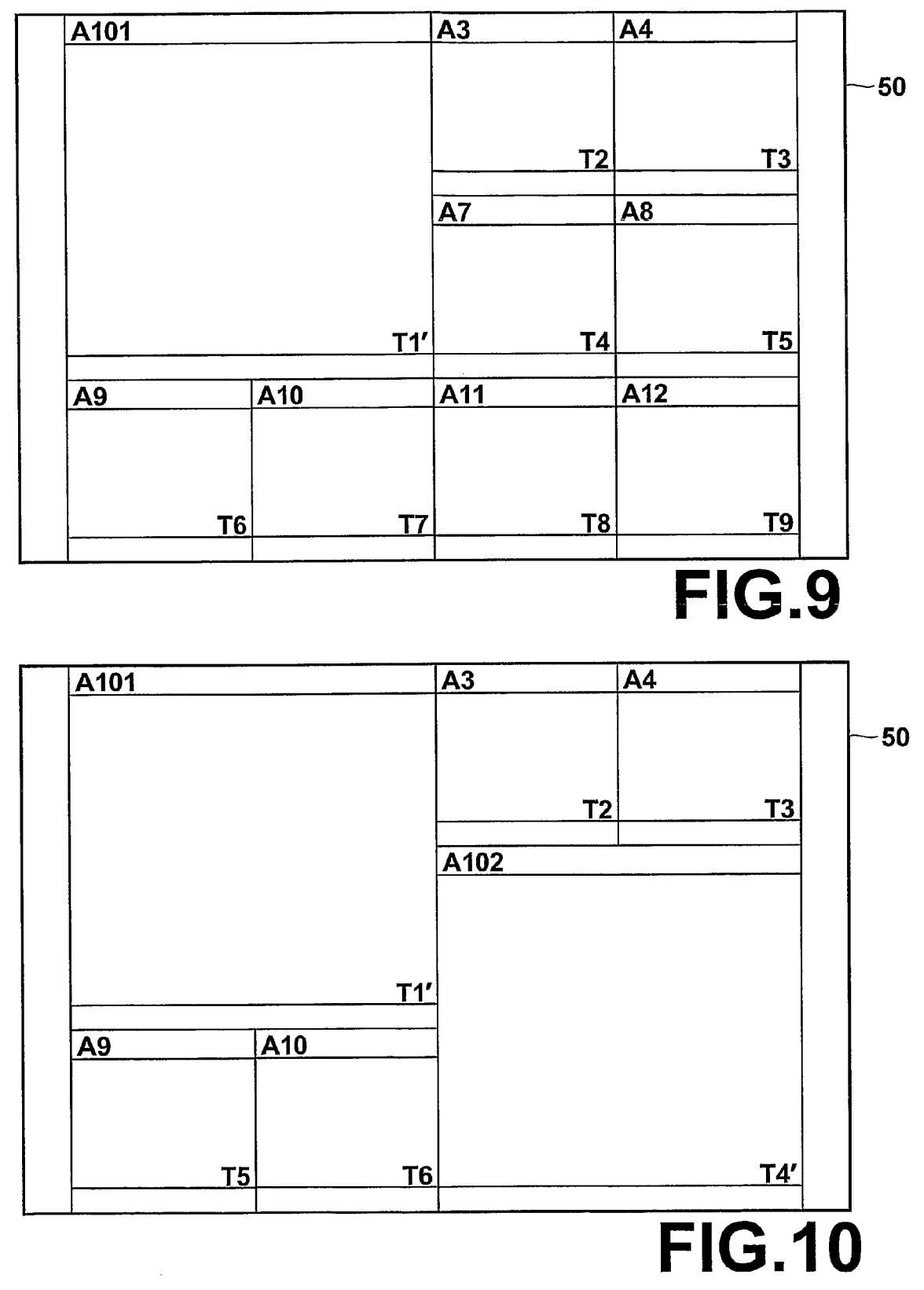

The catalog screen after the enlargement and the advancing processing is shown in FIG. 9. As shown in FIG. 9, the catalog screen 50 includes the image T1' that has been enlarged to the size of the similar area A101 and laid out in the similar area A101, in addition to the images T2~T9 respectively laid out in the reference areas A3, A4 and A7~A12.

The CPU 12 starts monitoring whether the user has selected any one of the images in the catalog screen 50 (Step ST7). If a result at Step ST7 is affirmative, the CPU 12 judges whether the selected image is the enlarged image (Step ST8). If a result at Step ST8 is negative, the procedure returns to Step ST3, and the procedure from Step ST3 is repeated. Therefore, in the case where the user has selected the image T4 in the catalog screen 50 shown in FIG. 9, the CPU 12 generates a similar area A102 from the reference areas A7, A8, A11, and A12, and lays out an enlarged image T4' in the similar area A102. Furthermore, the CPU 12 lays out the images T2, T3, T5, and T6 in the reference areas A3, A4, A9, and A10. The catalog screen 50 obtained in this manner is shown in FIG. 10.

Meanwhile, in the case where the result at Step ST8 is affirmative, the image selected by the user is the enlarged image. Therefore, in order to change the size of the enlarged image to the original size, the similar area in which the enlarged image has been laid out is divided into the four reference areas (Step ST9). In the case where the user has selected the image T1' shown in the catalog screen 50 in FIG. 9, the CPU 12 divides the similar area A101 into the four reference areas A1, A2, A5, and A6.

By dividing the similar area A101 into the four reference areas A1, A2, A5, and A6, the background area 52 becomes the initial screen shown in FIG. 6. Therefore, the CPU 12 reduces the enlarged image T1' selected by the user to the original size (Step ST10), and carries out retrieving processing for retrieving the images T10~T12 having been advanced to the next screen so that the images T1~T12 are laid out in the reference areas A1~A12 (Step St11). Consequently, the catalog screen 50 shown in FIG. 5 is displayed on the display unit 18, and the procedure returns to Step ST7.

Meanwhile, if the result at Step ST7 is negative, the CPU 12 judges whether the user has instructed to print (Step ST12). If a result at Step ST12 is negative, the procedure returns to Step ST7. If the result at Step ST12 is affirmative, layout of the images in the currently displayed catalog screen 50 is stored as layout information in the memory card 2 (Step ST13).

The layout information includes information on the layout of the reference areas and the similar areas in the catalog screen, and file names of the images laid out therein. The CPU 12 prints the currently displayed catalog screen 50 by using the printer 40 (Step St14) to end the procedure.

Figures 11, 12:
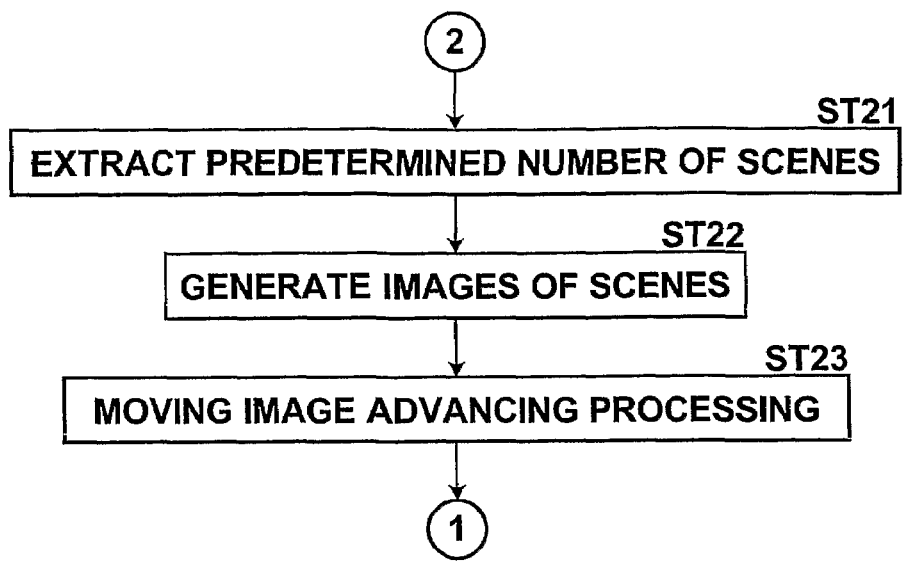
FIG. 11 is a flow chart showing processing for a moving image.
FIG. 12 shows the catalog screen after moving image advancing processing.

If the result at Step ST3 is affirmative, the CPU 12 carries out processing for a moving image. FIG. 11 is a flow chart showing the processing for a moving image. The CPU 12 selects a predetermined number of scenes (4 scenes, in this embodiment) from the selected moving image (Step ST21). For example, in the case where the image T2 is the first scene in a moving image and the user has selected the image T2, the CPU 12 selects four scenes from the moving image from which the image T2 has been obtained. The scenes are extracted in such a manner that the extracted scenes are separated at regular time intervals.

The CPU 12 generates images of the four scenes (Step ST22), and carries out moving image advancing processing (Step ST23). The procedure then goes to Step ST7 in FIG. 3.

By generating the four images from the one image, four of the reference areas are filled with the images generated from the one image. For example, in the case where four images T21~T24 are generated from the image T2, the images T21~T24 are laid out in the reference areas A2~A5 starting from the reference area A2 in which the image T2 was arranged. As a result, not all the 12 images T1~T12 initially displayed in the catalog screen 50 can be displayed. Consequently, the CPU 12 deletes the images T10~T12 having the latest, second latest, and third latest photography time and date from the images T1~T12 in the catalog screen 50, and lays out the images T3~T9 in the reference areas A6~A12, respectively. The deleted images T10~T12 are included in the next screen of the catalog screen 50. This processing is referred to as the moving image advancing processing. The catalog screen 50 after the moving image advancing processing is shown in FIG. 12.

As shown in FIG. 12, the reference areas A1~A12 are respectively filled with the images T1, T21~T24, and T3~T9. In the case where the user has selected any one of the images T21~T24 in this state, the first scene of the image T2 from which the images T21~T24 were obtained is generated, and the images T21~T24 are deleted while the images T10~T12 moved to the next screen are returned to be displayed in the initial catalog screen 50 shown in FIG. 5.

As has been described above, in this embodiment, any one of the images selected by the user is regarded as a preferred image of high priority, and the image is enlarged to be inscribed in the similar area comprising more of the reference areas. Therefore, the image of high priority is displayed as an enlarged image in the catalog screen 50 while the other images are displayed smaller than the image of high priority. Consequently, the images can be laid out with the image of high priority being enlarged, without a template. Furthermore, by simply selecting any one of the images, the images are laid out. Therefore, the images can be laid out easily. In addition, since the images are laid out by being inscribed in the reference areas and the similar areas, calculation for enlargement and reduction can be easy. Therefore, the image layout processing can be carried out fast.

In the case where the images in the catalog screen 50 includes an image generated from a moving image and the user has selected the image, more scenes are extracted from the image and displayed. Therefore, moving images can also be laid out with ease.

If the user selects any one of the images having been selected once, the selected image is reduced to be inscribed in the corresponding reference area. Therefore, the user can easily lower the priority of the image that the user once judged to be high.

By storing the layout information in the memory card 2, printing and display of the images can be carried out later with use of the layout information.

Figure 13C:
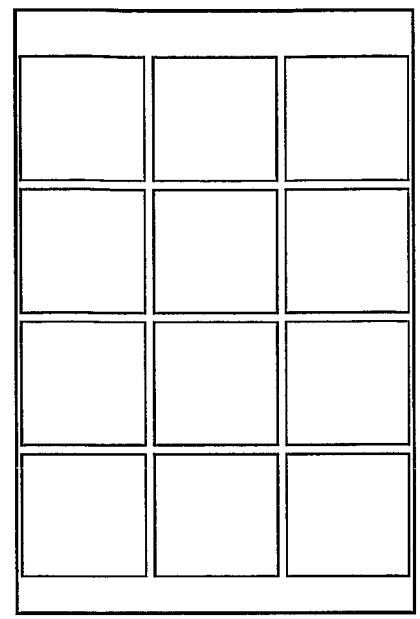
FIGS. 13A to 13C show other examples of reference areas set in a background area.
Figure 13B:
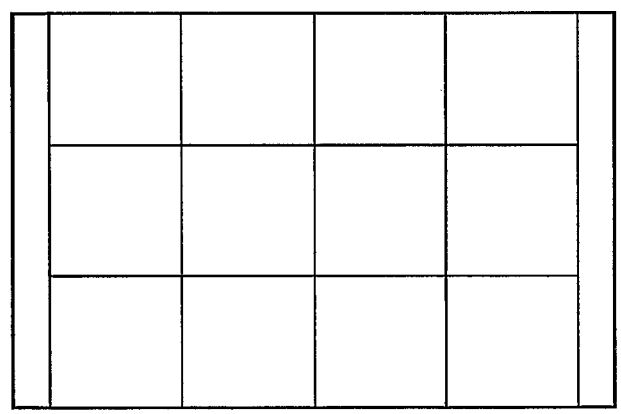
Figure 13A:
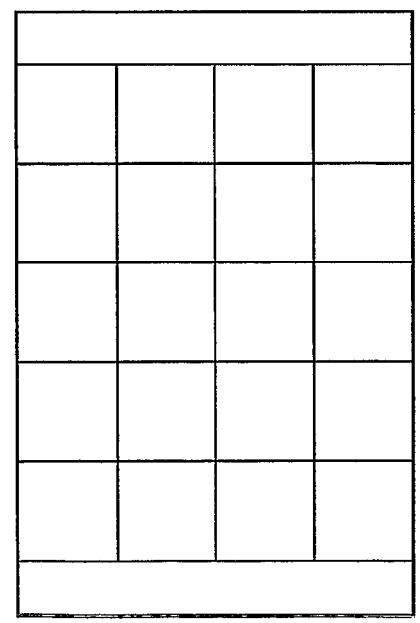
Figure 14:
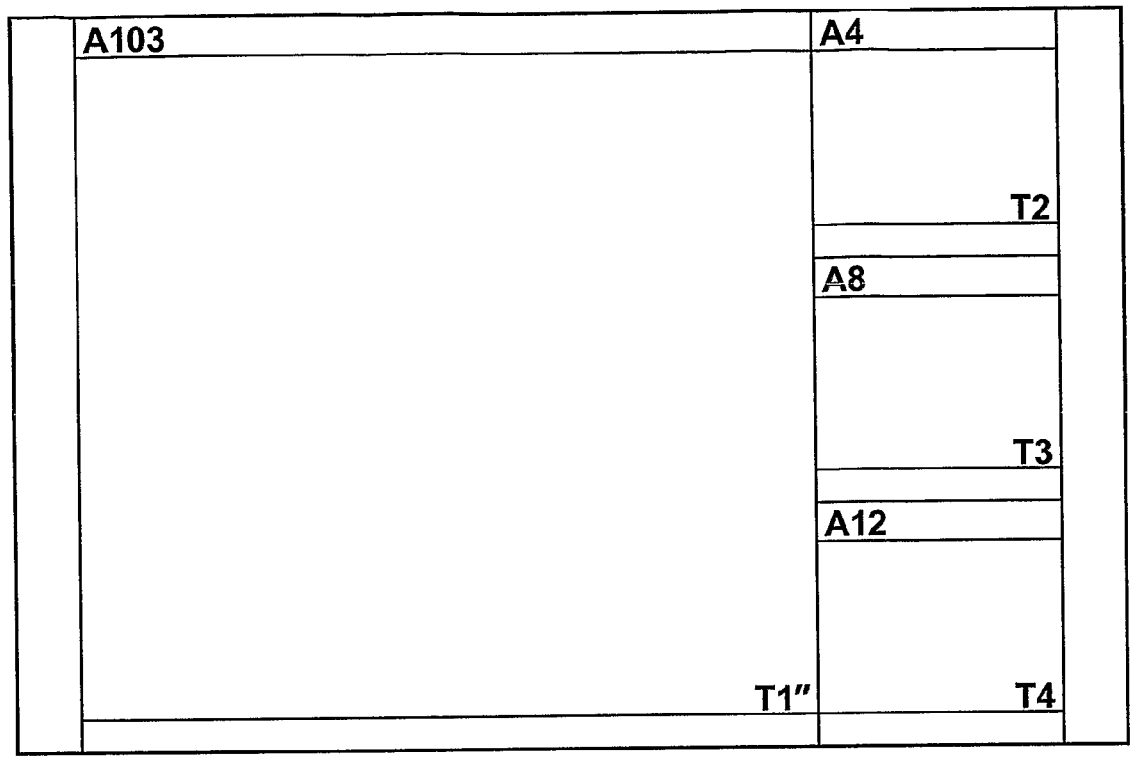
FIG. 14 shows the catalog screen after further enlargement and advancing processing.

In the embodiment described above, the 3×4 reference areas are set in the background area 52, as shown in FIG. 6. However, the reference areas are not necessarily limited thereto, and 4×5 reference areas shown in FIG. 13A or 4X3 reference areas in a vertically elongated background area in FIG. 13B may also be used. Furthermore, the reference areas are not necessarily arranged without the spacing. For example, the reference areas may be spaced evenly as shown in FIG. 13C.

In the embodiment described above, the image selected by the user is enlarged, and the enlarged image is reduced when the enlarged image is selected again. However, the enlarged image may be enlarged further when the enlarged image is selected again so that the image can be inscribed in a similar area comprising 3×3 reference areas. More specifically, when the enlarged image T1' shown in the catalog screen 50 in FIG. 9 is selected again, a similar area A103 comprising 3×3 reference areas, namely the reference areas A1, A2, A3, A5, A6, A7, A9, A10, and A11, is generated so that a further enlarged image T1" can be laid out by being inscribed therein. The reference areas A4, A8, and A12 are filled with the images T2, T3, and T4, in this case. In the case where the further enlarged image is selected, the image is reduced to be inscribed in the original reference area A1.

In the embodiment described above, the user may set the priority in advance while viewing the images so the images are laid out in the catalog image 50 on the digital camera 1 by being arranged according to the priority. In this case, when the user instructs to display the catalog screen 50, the catalog screen 50 including the image of high priority enlarged in advance is displayed as shown in FIG. 10.

Figure 15:
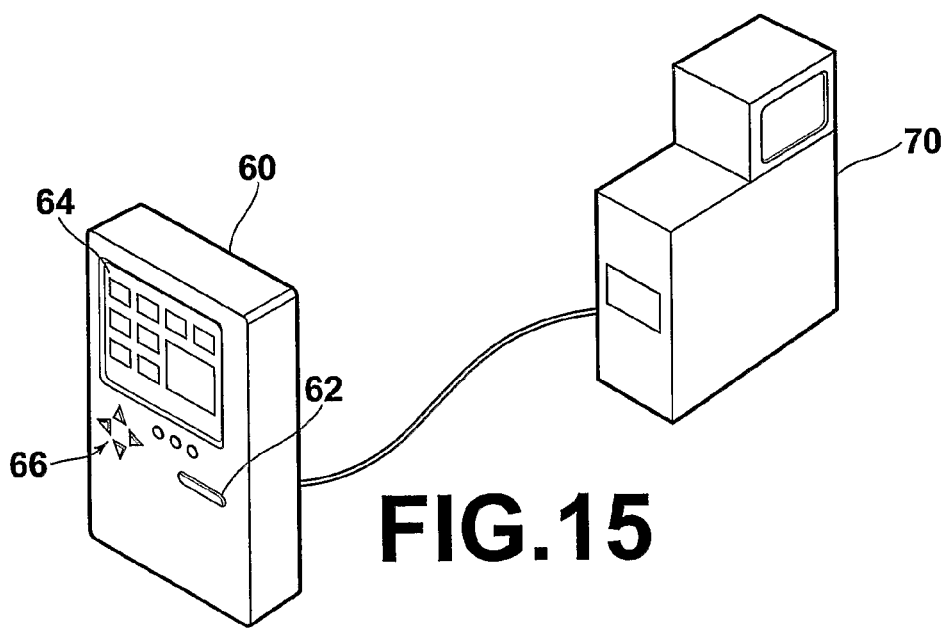
FIG. 15 shows how an order terminal is connected to a printer.

In the embodiment described above, the image layout apparatus of the present invention is installed in the digital camera 1. However, the image layout apparatus may be installed in an order terminal 60 used in a DPE store for placing a print order, as shown in FIG. 15. The order terminal 60 comprises a card slot 62 for inserting a memory card recorded with images, a liquid crystal display panel 64 for various kinds of display such as display of the catalog screen, and an input unit 66 comprising various kinds of input buttons. The order terminal 60 is connected to a printer 70 installed in the DPE store.

By installing the image layout apparatus of the present invention in the order terminal 60, a high-quality print can be obtained at the DPE store. By storing the layout information in the memory card through the image layout processing carried out by the user with use of the digital camera 1, the order terminal 60 can read the layout information from the memory card, and can immediately carry out printing according to the layout information.

A program for causing a computer to carry out the functions of the image layout apparatus of the present invention may be installed in a personal computer so that the personal computer can carry out layout and printing of the images in the same manner as the embodiment described above.

The invention claimed is:

1. An image layout apparatus for laying out images, the image layout apparatus comprising:
   layout control means for laying out the images in a background area having a plurality of rectangular reference areas by respectively inscribing the images in the reference areas;
   display means for displaying a catalog of the images laid out in the background area; and
   input means for receiving input to specify images within the catalog of the images;

the layout control means laying out all of the images such that they are inscribed within the reference areas, designating a specified image as an image having a high degree of priority and laying out the image in a similar area corresponding to a number of reference areas equal to the number of times that the image is specified by the input means, in the case that a specified image among the laid out images is a still image, and laying out images which are excluded as processing targets due to this layout operation from among those in the background area to a next background area; and the layout control means extracting scenes included in a video in the case that videos are included in the plurality of images and is specified by the input means, laying out each of the extracted scenes such that they are inscribed in the reference areas, and laying out images which are excluded as processing targets due to this layout operation from among those in the background area to a next background area.

2. The image layout apparatus according to claim 1, wherein the layout control means lays out the image having been arranged in the similar area in the corresponding original reference area by inscribing the image in the reference area in the case where the still image has been specified more than a predetermined number of times.

3. The image layout apparatus according to claim 1, further comprising saving means for storing information on layout of the images as layout information.

4. The image layout apparatus according to claim 1 further comprising printing means for printing the images having been laid out.

5. The image layout apparatus according to claim 1 further comprising that the image layout apparatus is installed in a digital camera.

6. The image layout apparatus according to claim 1 further comprising that the image layout apparatus is installed in an order terminal for placing a print order regarding the images.

7. An image layout method for laying out images, the method comprising the steps of:
 laying out the images in a background area having a plurality of rectangular reference areas by respectively inscribing the images in the reference areas;
 displaying a catalog of the images laid out in the background area, and
 receiving input to specify images within the catalog of the images;
 laying out all of the images such that they are inscribed within the reference areas, designating a specified image as an image having a high degree of priority and laying out the image in a similar area corresponding to a number of reference areas equal to the number of times that the image is specified, in the case that a specified image among the laid out images is a still image, and laying out images which are excluded as processing targets due to this layout operation from among those in the background area to a next background area; and
 extracting scenes included in a video in the case that videos are included in the plurality of images, laying out each of the extracted scenes such that they are inscribed in the reference areas, and laying out images which are excluded as processing targets due to this layout operation from among those in the background area to a next background area.

8. A non-transitory computer-readable storage medium encoded with a computer executable program for causing a computer to execute an image layout method for laying out images, the program comprising the procedures of:
 laying out the images in a background area having a plurality of rectangular reference areas by respectively inscribing the images in the reference areas;
 displaying a catalog of the images laid out in the background area; and
 receiving input to specify images within the catalog of the images;
 laying out all of the images such that they are inscribed within the reference areas, designating a specified image as an image having a high degree of priority and laying out the image in a similar area corresponding to a number of reference areas equal to the number of times that the image is specified, in the case that a specified image among the laid out images is a still image, and laying out images which are excluded as processing targets due to this layout operation from among those in the background area to a next background area; and
 extracting scenes included in a video in the case that videos are included in the plurality of images, laying out each of the extracted scenes such that they are inscribed in the reference areas, and laying out images which are excluded as processing targets due to this layout operation from among those in the background area to a next background area.

* * * * *